United States Patent
Drako et al.

(10) Patent No.: US 10,403,063 B2
(45) Date of Patent: *Sep. 3, 2019

(54) GEO-LOCATION ESTIMATE (GLE) SENSITIVE PHYSICAL ACCESS CONTROL METHODS OF OPERATION

(71) Applicants: Dean Drako, Austin, TX (US); Steven Van Till, Bethesda, MD (US); Eoin Cosgrave, Bethesda, MD (US); Lee Odess, Bethesda, MD (US); John Szczygiel, Bethesda, MD (US)

(72) Inventors: Dean Drako, Austin, TX (US); Steven Van Till, Bethesda, MD (US); Eoin Cosgrave, Bethesda, MD (US); Lee Odess, Bethesda, MD (US); John Szczygiel, Bethesda, MD (US)

(73) Assignee: BRIVO SYSTEM LLC, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/392,240

(22) Filed: Dec. 28, 2016

(65) Prior Publication Data

US 2017/0109954 A1    Apr. 20, 2017

Related U.S. Application Data

(63) Continuation of application No. 14/841,711, filed on Sep. 1, 2015, now Pat. No. 9,652,913.
(Continued)

(51) Int. Cl.
*G07C 9/00* (2006.01)
*H04W 4/021* (2018.01)
(Continued)

(52) U.S. Cl.
CPC ....... *G07C 9/00103* (2013.01); *G06K 7/1408* (2013.01); *G07C 9/00571* (2013.01);
(Continued)

(58) Field of Classification Search
CPC ...... G07C 9/00571; G07C 2009/00769; G07C 2209/03; G07C 2209/63; G07C 9/00103;
(Continued)

(56) References Cited

U.S. PATENT DOCUMENTS 8,625,796 B1 *   1/2014   Ben Ayed ........... H04L 63/0853
                                                          380/258
9,077,543 B2 *   7/2015   Luft ..................... H04L 9/3247
(Continued)

*Primary Examiner* — Ojiako K Nwugo
(74) *Attorney, Agent, or Firm* — Patentry; Peter G. H. Hwang

(57) ABSTRACT

A method operates a server that is coupled to a network controlling door actuators at physical geo-locations. The server receives through a wireless communication network a request to enable physical access at a portal using a secure channel and a geo-location estimate from a mobile device. A circuit of the mobile device receives radio signal magnitude, phase, and power from at least one transmitter and authentication input from a user interface. Dual secured communications paths protect the server on its separately provisioned request channel and actuator command channel. Each legacy electronically controlled access portal is enabled to support smartphones without installing a replacement multi-band radio frequency reader at the geo-location.

2 Claims, 10 Drawing Sheets

Related U.S. Application Data

(60) Provisional application No. 62/171,622, filed on Jun. 5, 2015.

(51) Int. Cl.
  *G06K 7/14* (2006.01)
  *H04L 29/08* (2006.01)
  *H04W 4/04* (2009.01)
  *H04W 12/08* (2009.01)
  *H04W 12/00* (2009.01)

(52) U.S. Cl.
  CPC .............. *H04L 67/02* (2013.01); *H04L 67/10* (2013.01); *H04W 4/021* (2013.01); *H04W 4/043* (2013.01); *H04W 12/08* (2013.01); *G07C 2009/00769* (2013.01); *G07C 2209/63* (2013.01); *H04W 12/00503* (2019.01)

(58) Field of Classification Search
  CPC ....... G06K 7/1408; H04L 67/02; H04L 67/10; H04W 4/021; H04W 12/08; H04W 4/043; H04W 4/33; H04W 4/70; H04W 4/80
  USPC ............................................... 340/5.61, 6.61
  See application file for complete search history.

(56) References Cited

U.S. PATENT DOCUMENTS

| | | | |
|---|---|---|---|
| 9,652,913 B2* | 5/2017 | Drako | G07C 9/00103 |
| 9,697,657 B2* | 7/2017 | Anderson | G06K 19/07381 |
| 9,979,544 B2* | 5/2018 | Bosworth | H04L 63/062 |
| 2014/0292481 A1* | 10/2014 | Dumas | G07C 9/00111 |
| | | | 340/5.61 |
| 2015/0140964 A1* | 5/2015 | Horton | H04W 12/08 |
| | | | 455/410 |
| 2015/0172920 A1* | 6/2015 | Ben Ayed | H04W 12/06 |
| | | | 713/172 |
| 2016/0012217 A1* | 1/2016 | Wolf | G06F 21/83 |
| | | | 726/18 |
| 2016/0171238 A1* | 6/2016 | Sibillo | G06F 21/6227 |
| | | | 713/164 |
| 2016/0269403 A1* | 9/2016 | Koutenaei | H04L 63/0861 |
| 2016/0358391 A1* | 12/2016 | Drako | G07C 9/00103 |

* cited by examiner

GEO-LOCATION ESTIMATE (GLE) SENSITIVE PHYSICAL ACCESS CONTROL METHODS OF OPERATION

CROSS-REFERENCES TO RELATED APPLICATIONS

This non-provisional application is a continuation application of currently Ser. No. 14/841,711 and also benefits from Ser. No. 62/171,622 filed 5 Jun. 2015 which is incorporated by reference in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention relates to physical access control and identity management, access control mechanisms for managing physical "points of service", physical access portals, or other physical resource access control methods and apparatus, wireless door actuators, locks, and security systems.

Description of the Related Art

Within this application the term physical access portal (portal) refers to a control point or boundary through which a person or vehicle or object can traverse if permitted or be denied transit whether it is an entrance or exit from or to a structure or area or region. Non-limiting examples of portals are doors, gates, lifts, elevators, bridges, tunnels, tubes, vehicles, chair, tow, canal lock, hatch, or wormhole.

As is known, mobile devices including wearable devices, communicating via the cellular telephone network, also include geo-location services by detecting signal strengths and phases from Global Positioning System (GPS) satellites, Wi-Fi Access Points, Cellular Base Stations, Bluetooth beacons, and other non mobile signal emitters which have fixed location. As is known, mobile devices may include circuits for image capture in 2D or 3D in visible and non-visible spectrum and comparison with stored images.

As is known, mobile devices including cellular phones and wearables often include NFC, RFID, and Bluetooth transceivers which can connect with security system readers.

Conventional access control systems depend on one or at most two factors of authentication. Usually a key or key card is a resonator energized by a reader. The reader is hard wired to a server which verifies access time and location of a particular door or entry. Upon presentation of the key card, an identity is transmitted to the server which operates a door lock/unlock solenoid through a wire or network. Mere possession of the key or key card enables access during certain times.

A Key Card is often lost by the user and needs to be replaced. This has a cost associated with it. The user needs to remember to bring the "key card" with them. They often forget and a temporary card needs to be issued. The key card is not always important to the user so they neglect it.

As is known in the industry there is a desire to replace the key card with a personal mobile phone because this eliminates an item that the user must carry-and her personal phone is an item that is important to the user so she takes constant care to retain it.

Mobile phones and other electronic devices do not today typically have an NFC or RFID built in. Many however have Bluetooth function built in. There is a desire to use this function to open the door and many products have been introduced to "read" a Bluetooth signal at the door. This solution, however, requires installation of new hardware at the door, which can be costly.

Another conventional access control system depends on knowledge of a pass code, phrase, numerical combination, or answers to questions. Knowledge of the shared secret enables access during certain times. Some systems use a combination of a NFC reader with a shared secret. Because the channels are essentially bidirectional the shared secret can be stolen.

Alternately, a cryptographic key code which is pseudo-randomly generated by a dedicated dongle has the problem of delivery to an authorized user and retention by the authorized user. It can be left behind, lost, or stolen.

As is known, physical access to the server compromises all security schemes.

What is needed is increased flexibility, granularity, and heightened security for access control. What is needed is a method to utilize mobile wirelessly connected personal devices to open doors without replacing the legacy hardware at the door

BRIEF SUMMARY OF THE INVENTION

A system includes a server coupled to a plurality of wirelessly connected mobile personal devices. The server receives through a wireless communication network a request to enable physical access at a portal using a secure channel and a geo-location estimate from a mobile device. A circuit of the mobile device receives radio signal magnitude, phase, and power from at least one transmitter and authentication input from a user interface. Dual secured communications paths protect the server on its separately provisioned request channel and actuator command channel. Each legacy electronically controlled access portal is enabled to support smartphones without installing a replacement multi-band radio frequency reader at the geo-location.

The mobile device transforms location data from among Global Positioning System satellites, cellular base stations, WiFi Access Points, Bluetooth beacons and other radio emitters with known locations into a Geo-Location Estimate coordinate with enough precision to uniquely identify a specific portal on a specific floor of a structure.

Upon user request or launched by a proximity trigger, an apparatus verifies a user identity, determines a geo-location estimate coordinate, and through a private channel transmits at a certain time to a access control service a one-time open command.

An access control server, securely coupled to a door control actuator, determines that a verified user is allowed access according to a rule. An exemplary rule enables physical access to an authenticated user within a range of time at a location when a one-time open command is received via a private channel.

A system couples legacy access controlled doors to modern wireless devices. A smartphone application obtains a Geo-Location Estimate (GLE) coordinate; the smartphone authenticates a user identity (fingerprint, passphrase, camera, etc.), transmits an access control request via a cellular or WiFi network to the server controlling the access, using a public/private key to protect the server and the facility from attack.

An access control server is coupled to a cellular network or Internet for access requests and also coupled to the equipment that grants access. The user and his location is authenticated for approved access at the GLE coordinate. A door control signal is transmitted to the door actuator. Each operation will result in a unique request due to the timestamp and prevents recording and playback.

Legacy Bluetooth, NFC, RFID and other radiofrequency (RF) readers may be operated in parallel and/or eventually retired at end of life. A physical access control server determines whether a GLE coordinate presented by a mobile device is within a specified range of the Geo-Location coordinate stored for each portal.

The physical access control server is connected to at least one physical access portal and transmits a command to enable or suppress access upon receiving and verifying a request from a mobile device via a wireless network. The wireless network may use Internet Protocol. The wireless network may use cellular data communication protocols.

An app is installed from a secure store to a mobile device. A public/private key pair is generated during download, installation, or launch for each instance of an installed app. A public/private key pair may be used for app communications with the access server. A digital certificate may be used for transport layer encryption.

The access server can be provisioned within the secured premises or the access server can be provisioned by a shared service in the cloud.

The access server may be reached via one or more intermediate servers or directly. The app optionally requires authentication of a user by the facilities of the wireless device: by passcode, fingerprint, camera, biometric, etc. The app receives and encrypts a GLE coordinate upon request. Through the cellular network, a request is transmitted to a server to actuate a door access control with a virtual card key. The request is authenticated to a specific device and to a specific user. Each transmitted request is unique.

The server receives the cellular data and decrypts an access request using its stored keys. The user id is verified for access control to time and place. The door closest to the GLE location of the devices is identified. Using a separate channel, e.g. wire, WAN, TCP/IP or other network, a signed command is transmitted to the door control unit for a limited period of time.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

Figure 1:
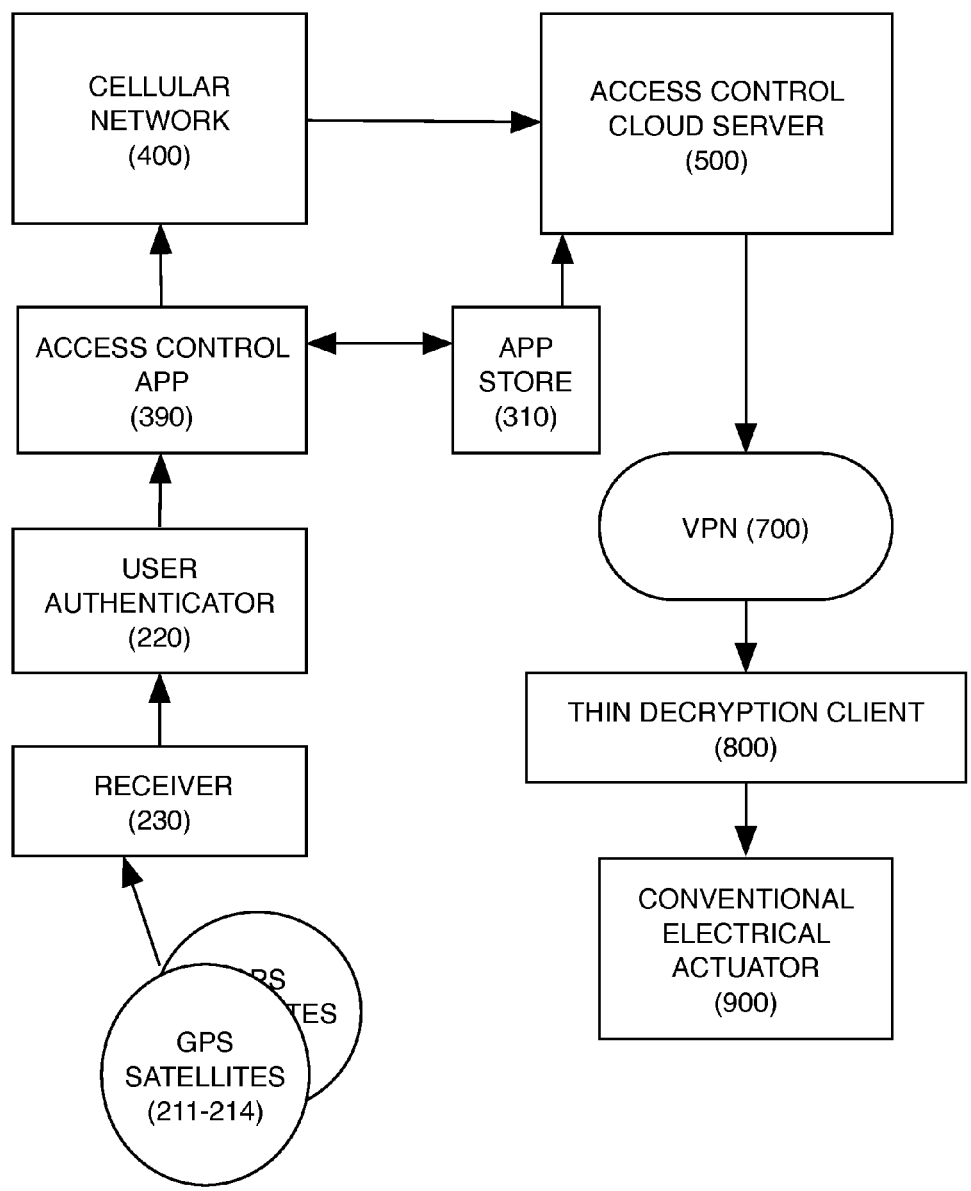
FIGS. 1-4 are block diagrams of embodiments of a system.

Mobile wireless devices are trending toward ubiquity and include compute and location services and identity authentication to protect their data stores. Those capabilities combined with connectivity disrupt conventional physical access control systems.

An over-the-air installable application provides identity verification, location, and secure communication to an electronic door system.

In one embodiment, a physical access control server is coupled to a wireless network and also connected directly (e.g. wired) to at least one access point or portal. A mobile device performing the instructions of an access control application exchanges information with the physical access control server using the wireless network. The physical access control server determines whether the operator of the mobile device is allowed access according to rules and then causes the portal to admit or deny transit.

In an embodiment, the network may utilize a TCP/IP protocol and a browser. In an embodiment, the network may provide a private network for a client-server transaction.

The physical access control server has a store of Geo-Location coordinates for each portal and verifies that the mobile device is transmitting from a location within a range from the portal. The specified distance is set by an administrator with authority over access control.

In one embodiment the physical access control server is located at a shared infrastructure data center remote from the location of the portals and coupled by a network to a panel controlling operation of the portals. In one embodiment, the physical access control server is provisioned within the boundaries of the structure, region, area, or facility protected by the physical access control system.

In an embodiment, the mobile device is a phone. In an embodiment, the mobile device is a wearable computing device. In an embodiment, the mobile device is a vehicle or an apparatus installable into a vehicle.

In an embodiment, the mobile device includes a circuit to identify its user. Such an identification circuit may be a biometric sensor. Such an identification circuit may be a password or pass code stored secret. Such an identification circuit may be a camera or other electromagnetic sensor. Examples include signature, fingerprint, iris, or DNA scanners.

In an embodiment the biometric measurement, image, or signature is transmitted to an identity server or the access control server for verification.

In an embodiment, the mobile device may be operable on a cellular phone network.

In an embodiment, the mobile device may be operable on an 802.11 radio protocol network.

In an embodiment, the access control server is coupled to a panel as a card reader and presents data that a legitimate card key would respond to a card reader.

In an embodiment, the connection into or out of the access control server travels through an encrypted transport tunnel such as provided by symmetric, asymmetric, or elliptical curve keys.

In an embodiment, a mobile device performing the instructions of an access control application contains identity information for a plurality of access control systems and selects which identity to authenticate based on its present GLE coordinate.

In an embodiment, the physical access control system provides GLE coordinates to a mobile device which checks that its current location corresponds to an allowed portal location.

In an embodiment, the physical access control system presents a webpage that may be operable by an enduser at a mobile wireless device having a browser which is enabled to verify and transmit credentials and a positive GLE location check.

In an embodiment, the mobile app receives and exhibits to the user indicia of the access request being granted or denied.

In an embodiment, GLE coordinates are provided to the phone which checks its current estimated location against allowed portals. In an embodiment, the current GLE coordinate is transmitted by the mobile device and checked at the server for access at the time and place for that user.

In an embodiment, GLE coordinate data is encrypted in flight from either the phone or the server. In an embodiment, GLE coordinate data is encrypted in storage and the encrypted coordinates match or fail without revealing the en clair coordinates.

Referring to FIG. 1, a system comprises an Access Control App 390 (App) which has been down loaded from a public or private App Store 310 and installed on a mobile communication device (smartphone). The App receives a GLE coordinate from a Receiver 230 which is a component of the smartphone, and a user identity from a user authenticator (220) component of the user interface of the smartphone. Using a unique encryption key generated with the App Store for each App instance, the App transforms the GLE coordinates and the user identity into an access request which is communicated through the cellular network (400) to an Access Control Cloud Server 500 (Server). The receiver 230 transforms signal measurements and payload from transmitters such as but not limited to GPS satellites 211-214 into a geo-location estimate coordinate.

The Access Control Cloud Server 500 has stored decryption keys, user identities, door locations, and time and place access rules. After determining the user and the App are authenticated, the Server determines the closest door within a range of the smartphone and sends an actuator command to a conventional electrical actuator 900 (Actuator). Being in the cloud, a virtual private network 700 couples the Server to a thin decryption client 800 for delivery to the actuator.

Figure 2:
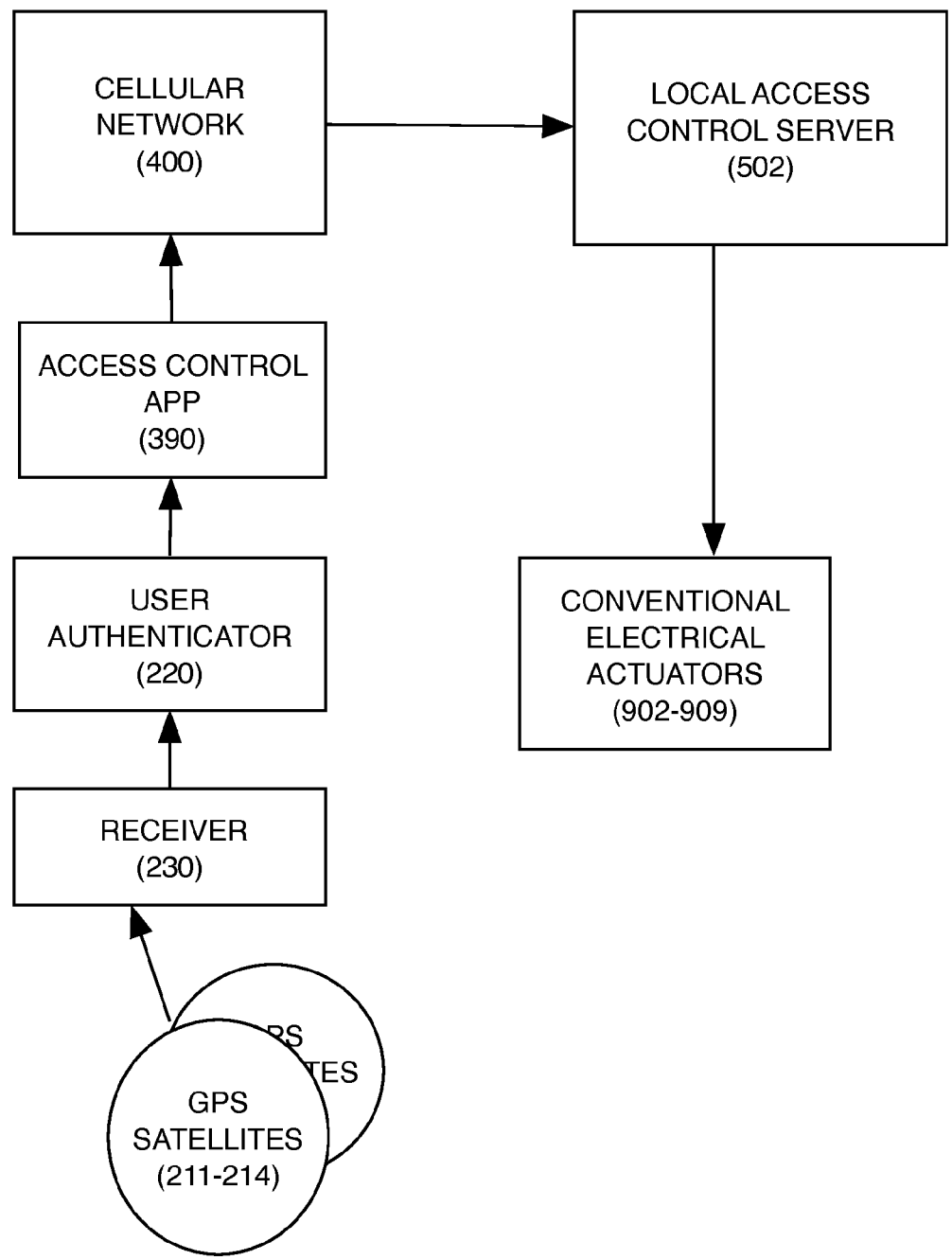

Referring now to FIG. 2, in an embodiment, a system includes: a local access control server 502 (server); the server further coupled to one or more electrical actuators 902-909; the server further coupled to an access control App 390 (App) via a cellular network 400; the App further coupled to a user authenticator 220, and to a receiver providing location services 230, which in an embodiment derives a geo-location estimate from signals provided by a plurality of GPS satellites 211-214.

Figure 3:
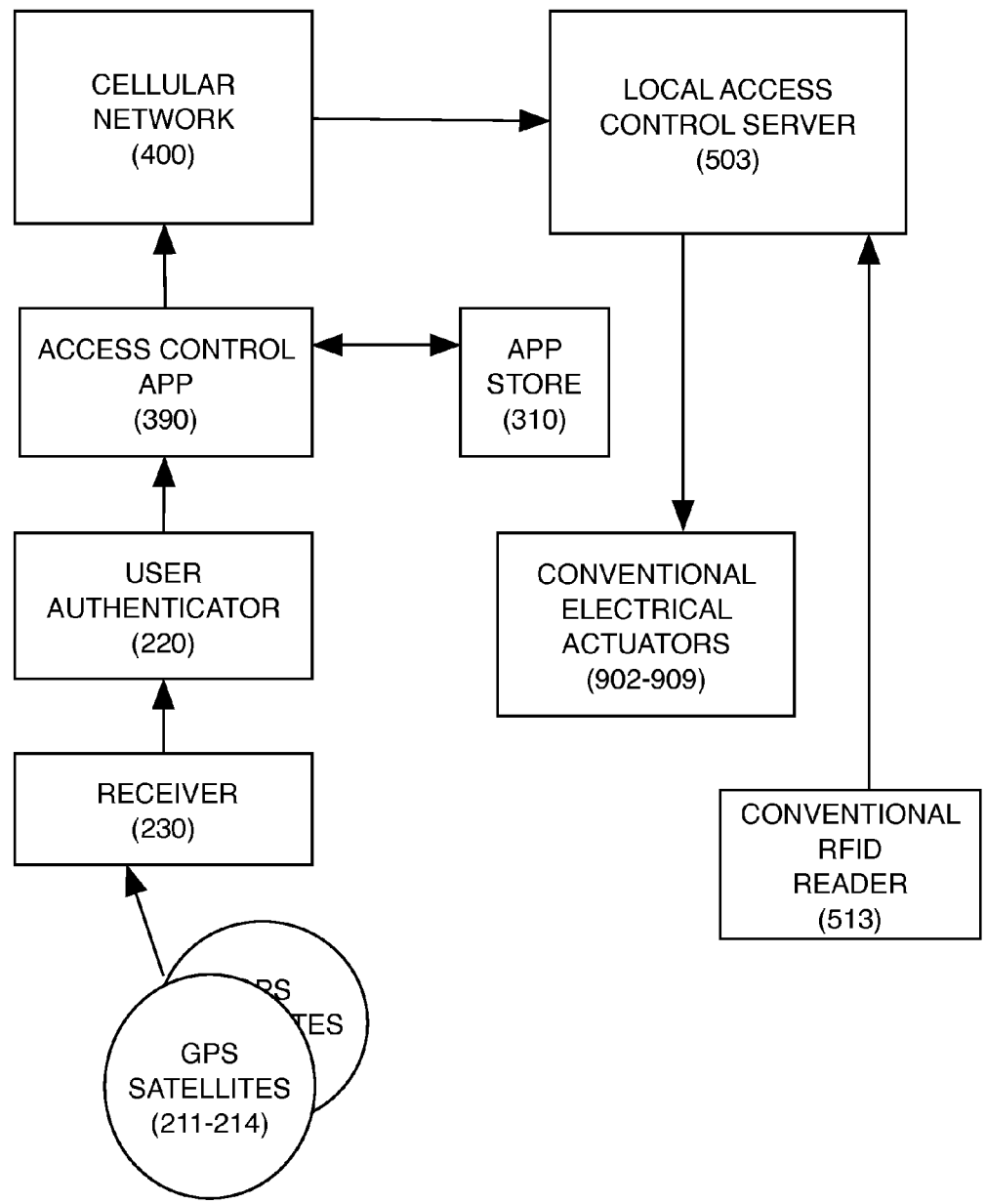

Referring now to FIG. 3, in an embodiment, a system includes: an RFID Reader 513 (reader), coupled to a local access control server 503 (server); the server further coupled to one or more electrical actuators 902-909; the server further coupled to an access control App 390 (App) via a cellular network 400; the App further coupled to an App Store 310, to a user authenticator 220, and to at least one receiver 230, wherein said receiver determines a geo-location estimate by analyzing signals from transmitters such as but not limited to GPS satellites 211-214.

Figure 4:
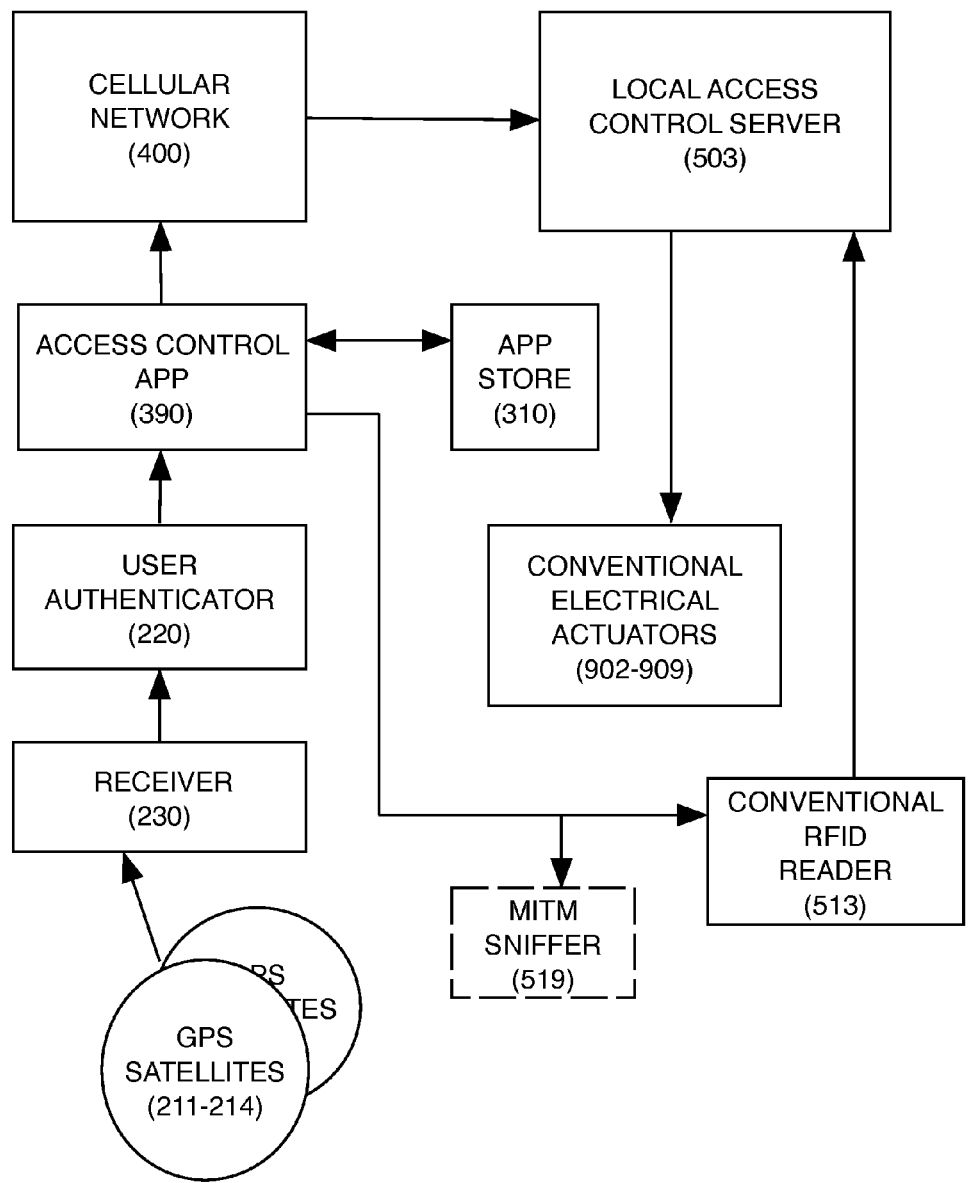

Referring now to FIG. 4, in an embodiment, a system includes: an RFID Reader 513 (reader), coupled to a local access control server 503 (server); the server further coupled to one or more electrical actuators 902-909; the server further coupled to an access control App 390 (App) via a cellular network 400; the App further coupled to an App Store 310, to a user authenticator 220, and to at least one receiver 230; wherein the App may transmit an NFC, RFID, Bluetooth, or other radiofrequency packet for amusement or confirmation to the reader 513 which may be observable to a man-in-the-middle sniffer 519, and wherein the receiver obtains a geo-location estimate from analyzing signals from transmitters such as GPS satellites 211-214.

Figure 5:
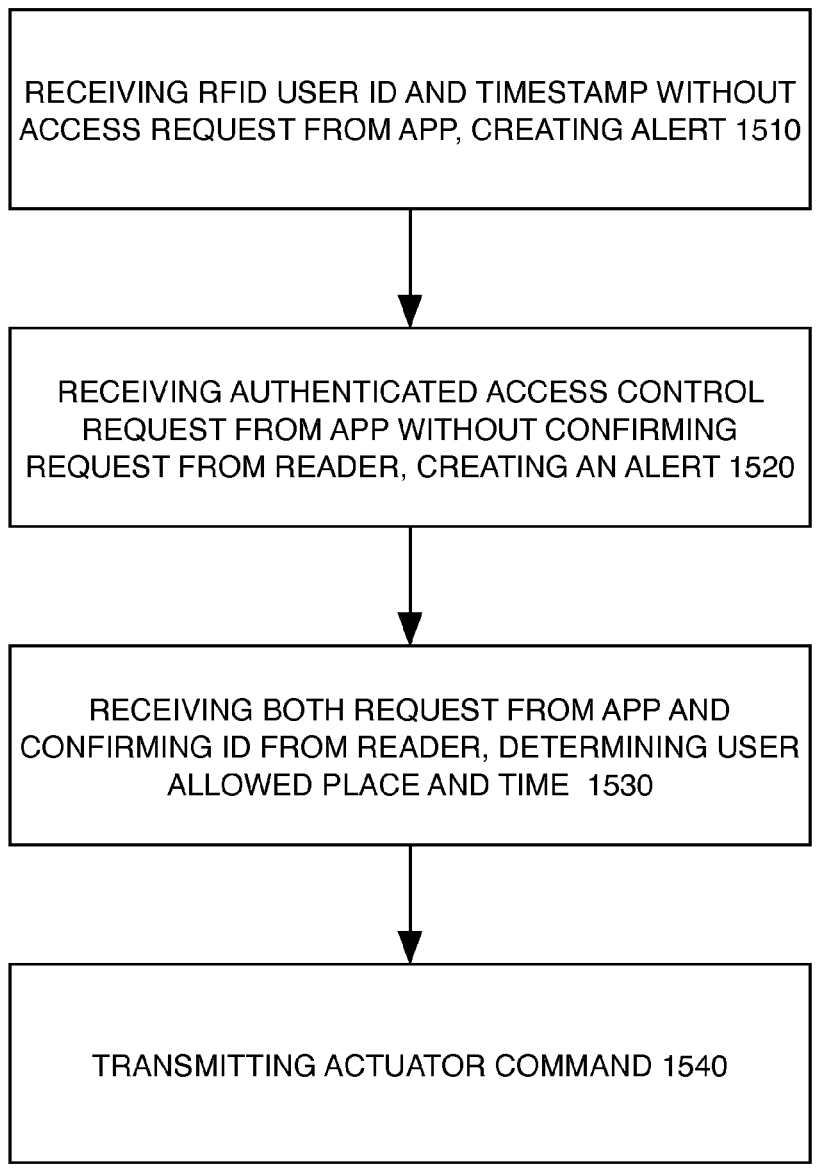
FIGS. 5-9 are flowcharts of methods.

Referring now to FIG. 5, in an embodiment, a method is disclosed for operation of an Access Control Server 503 (Server) communicatively coupled by a cellular network 400 to an Access Control App 390 (App); the server coupled to at least one actuator 902-909; and further coupled to a radiofrequency (RF) Reader 513, the method 1500 comprising: on a condition that RF Reader 513 has received a user identity and timestamp not confirmed by an access control request from the App, creating an Alert 1510 to surveillance operator and blocking access; on a condition that the server has received via the cellular network 400 an access control request from an authenticated Access Control App 390 which contains an authenticated user id, a GLE coordinate, and a timestamp; determining that the user is allowed access at the GLE area portal, during the requested time; and creating an Alert 1520 to surveillance operator and blocking access when not having received a confirming user identity and timestamp from RF Reader 513; on a condition that the server receives via the cellular network 400 an access control request from an authenticated Access Control App 390 which contains an authenticated user id, a GLE coordinate, and a timestamp; determining that the user is allowed access at the GLE area portal, during the requested time; and receiving 1530 a confirming user identity and timestamp from RF Reader 513, transmitting an access command 1540 to an actuator 902-909.

Figure 6:
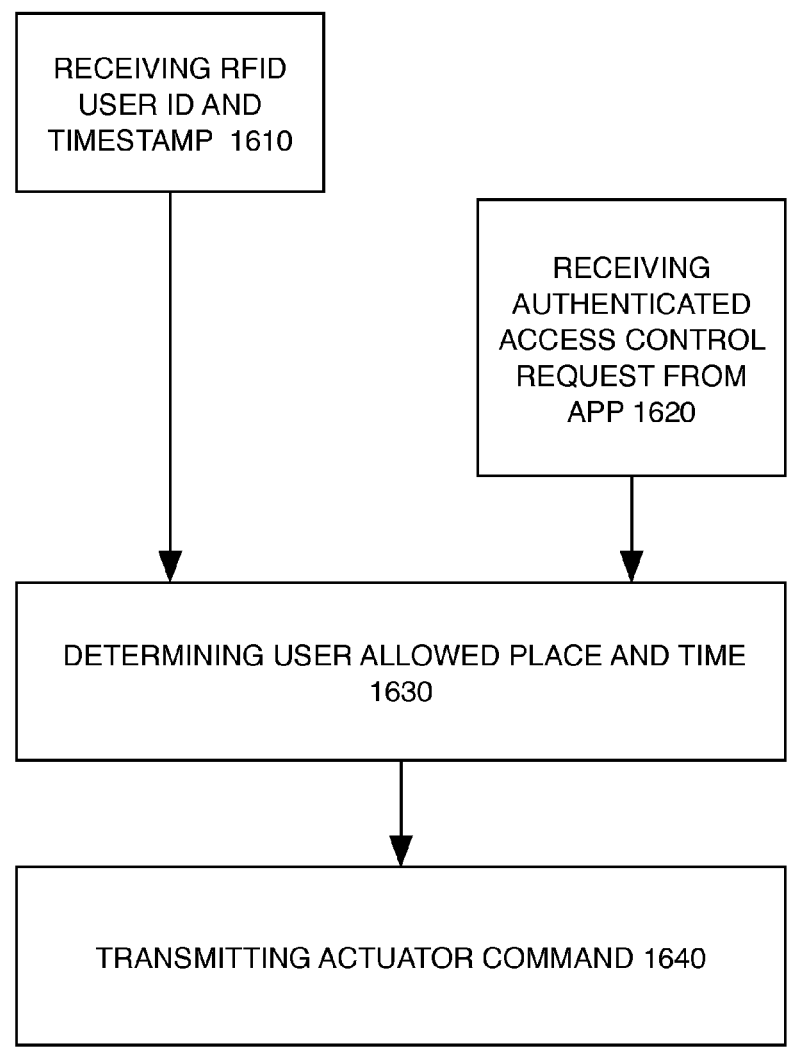

Referring now to FIG. 6, in an embodiment, a method is disclosed for operation 1600 of an Access Control Server 503 (Server) communicatively coupled by a cellular network 400 to an Access Control App 390 (App); the server coupled to at least one actuator 902-909; and further coupled to a radiofrequency Reader 513, the method comprising: a) receiving a user identity and timestamp 1610 from radio frequency Reader 513; OR b) on a condition that the server receives via the cellular network 400 an access control request from an authenticated Access Control App 390 which contains an authenticated user id, a GLE coordinate, and a timestamp 1620; THEN when a or b, determining that the user is allowed 1630 access at the GLE area portal, during the requested time; and transmitting an access command 1640 to an actuator 902-909.

Figure 7:
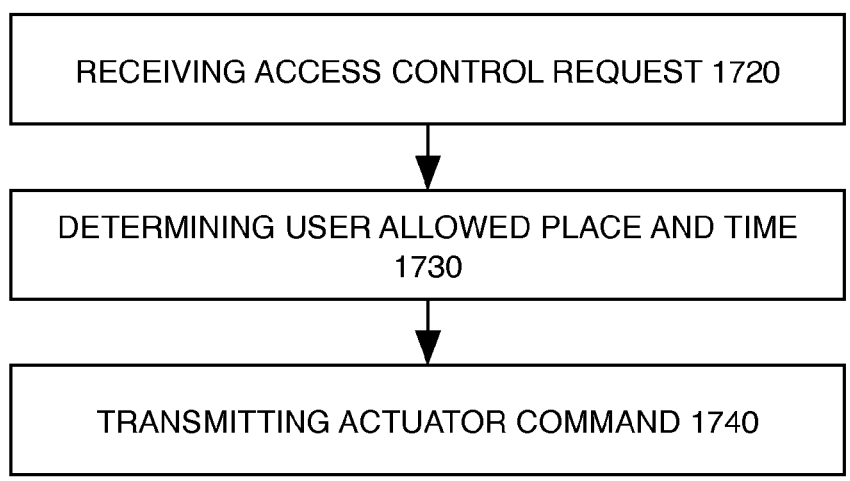

Referring now to FIG. 7, in an embodiment, a method is disclosed for operation 1700 of an Access Control Server 502 (Server) communicatively coupled by a cellular network 400 to an Access Control App 390 (App); the server coupled to at least one actuator 902-909; the method comprising: on a condition that the server receives 1720 via the cellular network 400 an access control request from an authenticated Access Control App 390 which contains an authenticated user id, a GLE coordinate, and a timestamp; determining 1730 that the user is allowed access at the GLE area portal, during the requested time; transmitting 1740 an access command to an actuator 902-909.

Figure 8:
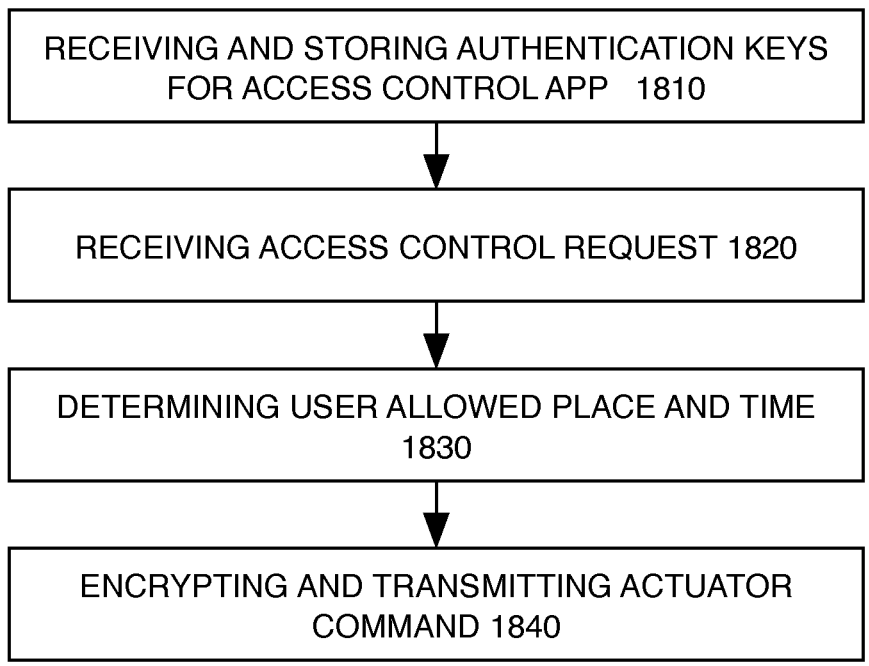

Referring now to FIG. 8, in an embodiment, a method is disclosed for operation 1800 of an Access Control Cloud Server 500 (Server) communicatively coupled by a cellular network 400 to an Access Control App 390 (App); the server coupled to an App Store 310, and in an embodiment the server communicatively coupled to at least one actuator 902-909 via a cryptographically secure IP network 700, 800; the method comprising: receiving and storing 1810 authentication keys from the App Store for each instance of an installed access control app 390, receiving via the cellular network 400 an access control request 1820 from an authenticated Access Control App 390 which contains an authenticated user id, a GLE coordinate, and a timestamp; determining 1830 that the user is allowed access at the GLE area, during a range containing the requested time; and encrypting and transmitting 1840 an access actuator command to an actuator within a specified area bounding the GLE coordinate of the access request.

Figure 9:
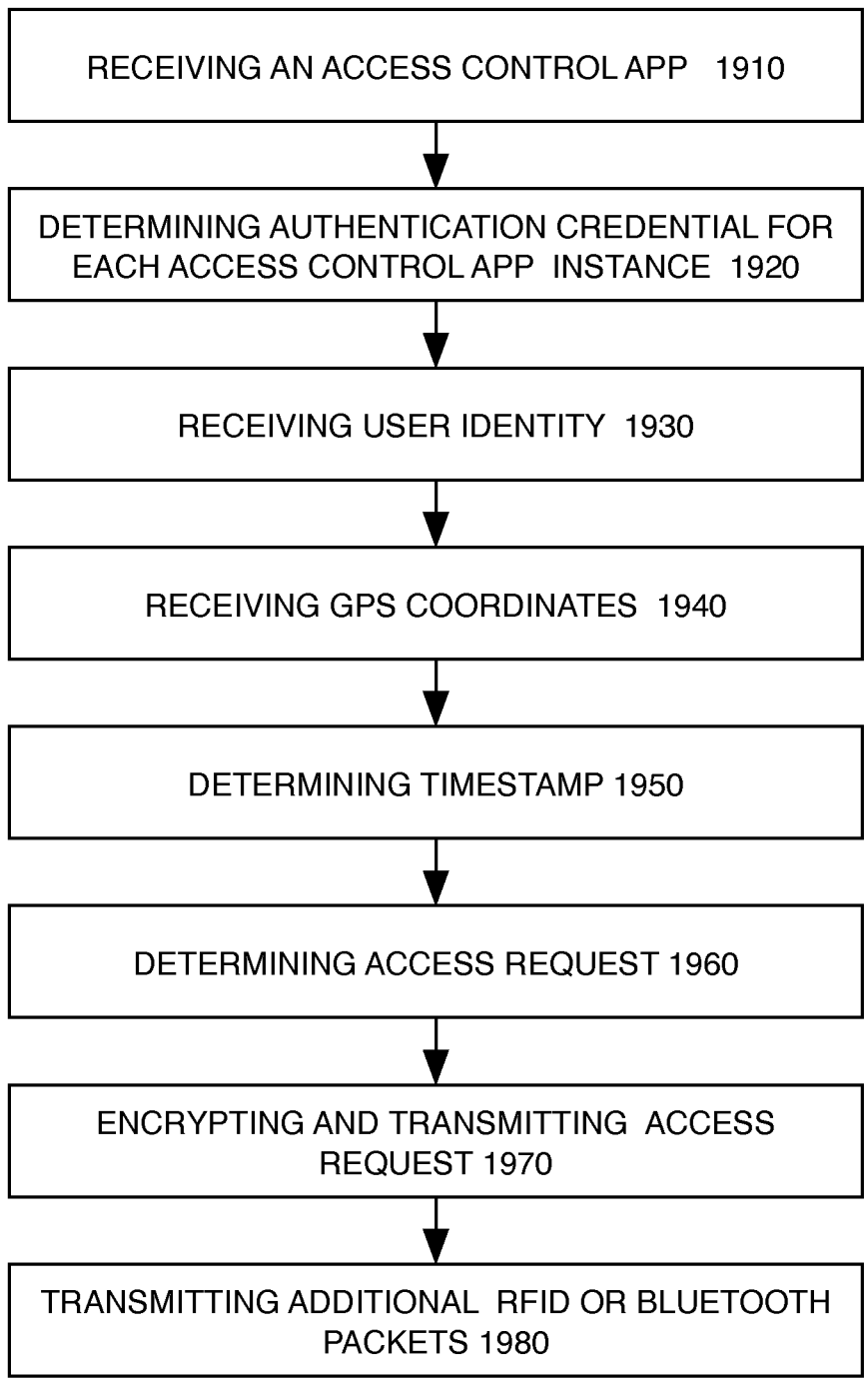

Referring now to FIG. 9, in an embodiment, a method 1900 is disclosed for operation of an application processor and a baseband processor within a mobile communication device performing computer executable instructions which cause the processors to perform: receiving from an App Store an Access Control App 1910 in an embodiment signed by a CA, determining authentication credentials for each instance of an installed App 1920, receiving from a user authenticator circuit a user identity 1930, receiving from a receiver circuit a GLE coordinate (such as provided by the Global Positioning System aka GPS) 1940 which estimates the present geo-location of the mobile communication device, determining a timestamp 1950; determining an access control request for the user within a time range within an area surrounding the GLE 1960; encrypting the request and transmitting it 1970 via a cellular network to one of a local access control server 503 or an Access Control Cloud Server 500; and in an embodiment, transmitting 1980 one of a confirming access request to an RFID Reader 513, or a deception rfid poison pill to a Man-in-the-Middle (MITM) sniffer.

Figure 10:
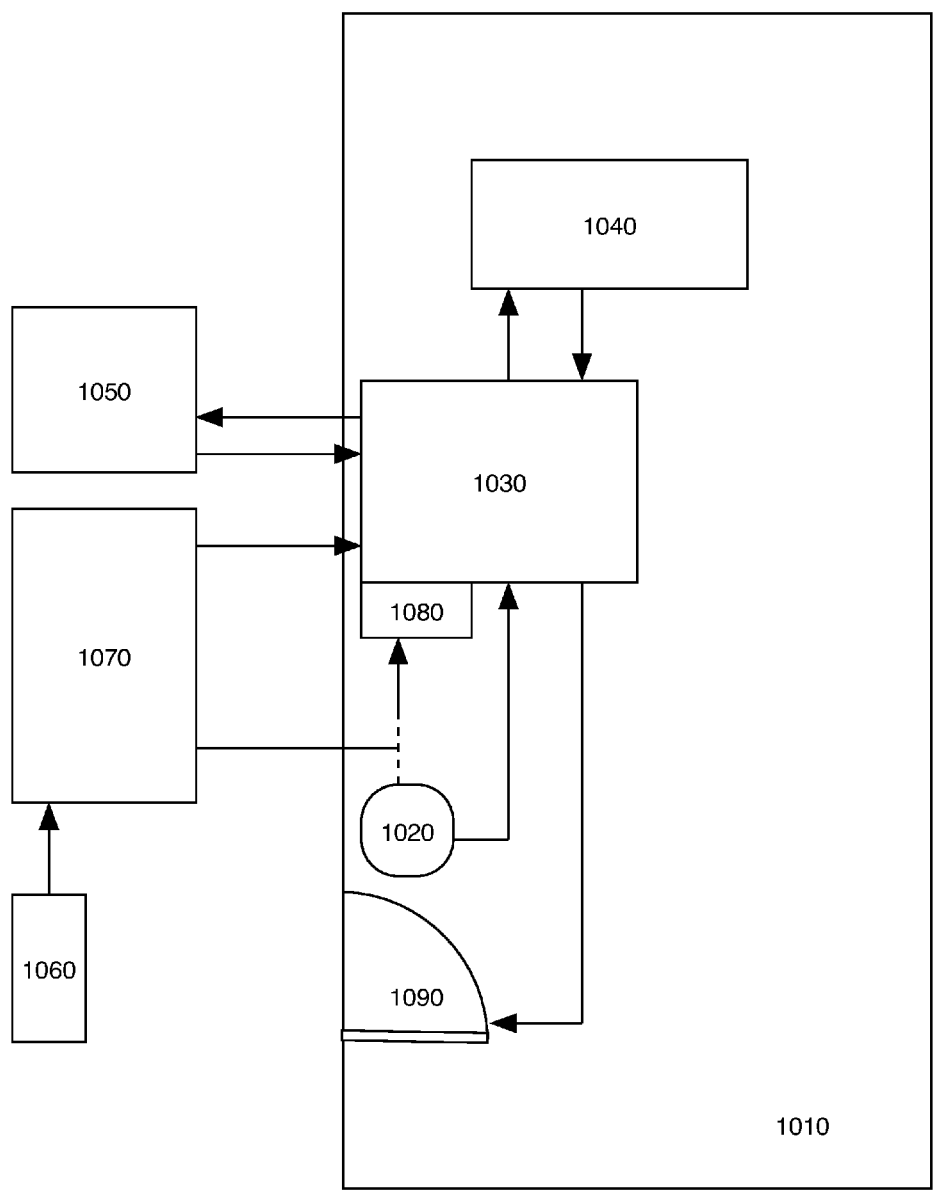
FIG. 10 is a dataflow diagram of system operation.

Referring now to FIG. 10, System 1000 includes components of an interconnected access control system for an access controlled enclosure. Enclosure 1010 prevents public access except to authorized users who are allowed during certain time ranges to transit a particular portal 1090.

An RFID/NFC energizer-reader 1020 installed next to a portal provides access to anyone holding a keycard containing identity information of an authorized user.

A panel 1030 receives identity information obtained by each reader 1020 of an enclosure 1010 and energizes actuators which control the electrically operable portals 1090.

A local computing device 1040 receives identity information from a panel 1030, searches a store of authorized identities and rules, and causes the panel to energize an actuator when the identity information presented at a reader is consistent with the store.

A remote shared computing device 1050 receives identity and portal information from a panel, determines from a store if the access is allowed and causes the panel to energize an actuator when the identity information presented at a reader is consistent with the store A mobile wireless device 1060 transforms GLE coordinate information from a plurality of receivers and identity information from an identification circuit, and transmits it to wireless connected cloud server 1070. Verification of identity, GPS coordinate, access control, and time of day may be performed in the mobile device, in the cloud server, or in the local server.

A wireless connected cloud server 1070 receives GLE and identity information from a mobile wireless device, determines a condition that the geo-location estimate coordinate of the mobile device is within a specified range of a portal, validates access permission for the identity at that place and time, and causes a panel to energize an actuator.

A panel adapter 1080 couples to a panel and presents the credential information consistent with that received by a key card reader when a wireless server receives GLE and identity information that is consistent with a store.

Portal 1090 is an electrically operable hatch, door, or elevator.

One aspect of the invention is a system for physical access control of a structure or an area which system includes at least one mobile wireless device which combines a cellular communication transceiver and at least one receiver enabled to receive and measure GPS, Bluetooth, or WiFi radio signals, their signal strength, and the phase of clock signals and pseudo-random codes; a physical access portal located at a known global positioning system coordinate; a physical access control server coupled to a wireless network and further coupled to an actuator operable to secure or release the physical access portal; and a store of user identities and time windows when an authenticated user may traverse the physical access portal within a range set by an administrator of a global positioning system coordinate.

In an embodiment, a geo-location estimate may be determined by transforming any combination of image, turnstile, zwave, zigby, rfid, nfc, Bluetooth, and cell tower data, signal strength, or clock timing.

In an embodiment, a mobile wireless device is a cellular phone.

In an embodiment, a mobile wireless device is a vehicle or an apparatus installable into a vehicle.

Proximity to a signal source measured by signal strength such as a Bluetooth beacon or WiFi Access Point may trigger a physical access control application to launch.

In an embodiment, the physical access control server is provisioned within the premises of at least one physical access portal, or is remotely provisioned by a shared service provider.

In an embodiment, a mobile wireless device further includes a circuit for identity verification.

In embodiments, a circuit for identity verification can be a camera, a passcode checker, a biometric sensor, or an accelerometer.

In an embodiment, a mobile wireless device also includes a circuit to determine proximity-traits and rules to evaluate traversal-traits.

In an embodiment, the wireless network is a wide area cellular telephone service using GSM/LTE protocol.

In an embodiment the wireless network is 802.11 access point coupled to a local area network using TCP/IP protocol.

In embodiments, the physical access portals include but are not limited to an electrically operable hatch, gate, bridge, door, elevator, vehicle, seat, tow, or tube.

In an embodiment, the physical access control server is coupled to a panel in replacement of badge energizer/readers.

Another aspect of the invention is a method for operation of a mobile wireless device including the steps: encrypting a GLE coordinate and identity; and wirelessly transmitting the encrypted GLE coordinate and identity to a physical access control server; and displaying the success or failure of a request to operate a physical access portal.

In embodiments, the access control rule may be provisioned to and evaluated at the panel, at the access control server, or at the mobile device.

In embodiments, encrypting uses SSL or uses a public/private keypair or symmetrical, asymmetrical, or elliptical curve encryption.

In an embodiment, the method also includes determining a geo-location estimate (GLE); selecting among a plurality of identities for the identity having a physical access portal closest to the GLE coordinate; and transmitting an access request using the selected identity to an associated physical access control server.

In an embodiment, the method also includes transmitting biometric information of the user to the physical access control server.

In an embodiment, the method also includes determining whether a mobile wireless device is within range of a stored geo-location coordinate as a prior condition to transmitting a physical access request to a server.

In embodiments, the execution of the processes occur in an app or in a browser.

Another aspect of the invention is a method for operating a physical access control server including the steps: receiving a GLE coordinate and identity from a mobile wireless device; verifying that the user is permitted to traverse a physical access portal within a range of the GLE coordinate within the present time range; and transmitting a enablement command to the actuator.

In an embodiment, the method includes presenting a webpage to a browser to receive an identity and GLE coordinate.

In an embodiment, the method also includes decrypting an identity and GLE coordinate.

In an embodiment, the method also includes verifying the identity biometrically and acknowledging the successful enablement.

In an embodiment, the method also includes emulating an NFR/RFID keycard resonator/reader to an access control panel.

CONCLUSION

The invention is easily distinguished from conventional electronic access control systems which cannot economically migrate to make use of smartphones and which have physical security weaknesses. The present invention uses cryptographically secure protocols to address the limitations of key cards such as: loss of key cards, limited compute power within an inexpensive key card, and detection of attacks.

The invention is easily distinguished from systems which require retrofitting legacy doors with new radio frequency hardware. The invention is easily distinguished from any system that requires expensive dedicated high compute circuits to be distributed and carried by users. The invention is easily distinguished by enablement of visitor or occasional user access by offering an over the air installation.

The techniques described herein can be implemented in digital electronic circuitry, or in computer hardware, firmware, software, or in combinations of them. The techniques can be implemented as a computer program product, i.e., a computer program tangibly embodied in a non-transitory information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The invention is distinguished by preventing a third party from measuring signals at the location of the door to record and decode a signal between the smartphone and the door. Each instance of the App authenticates a request for a geo-location area for an identified user. The channel for conveying requests is diverse from the channel for conveying the door access command. Both request and command are intrinsically geo-location and time-limited unlike a physical key or key card which typically of themselves do not expire.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; internal hard disks or removable disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method for operation of a mobile wireless device comprising:

encrypting a Geo-Location Estimate (GLE) coordinate and identity;

wirelessly transmitting a physical access request comprising the encrypted GLE coordinate and identity to a physical access control server;

displaying the success or failure of a request to operate a physical access portal; and determining whether a mobile wireless device is within range of a stored GLE location as a prior condition to transmitting said physical access request to a server.

2. A method for operation of a mobile wireless device comprising:

receiving and storing authentication keys from an App Store for an installed access control app;

encrypting a Geo-Location Estimate (GLE) coordinate and identity;

wirelessly transmitting via a cellular network an access control request which contains an authenticated user id, the encrypted Geo-Location Estimate (GLE) coordinate and identity, and a timestamp to a physical access control server to operate a physical access portal;

displaying that the user is allowed access at a geo-location area portal;

displaying a success or a failure of said request to operate a physical access portal; and transmitting a record of the entry within a specified area bounding the GLE coordinate of the access request.

\* \* \* \* \*